(No Model.) 2 Sheets—Sheet 2.

J. B. COE.
CULINARY CHOPPER.

No. 489,647. Patented Jan. 10, 1893.

WITNESSES: H. A. Hall. M. W. Jackson.

INVENTOR: Jno. B. Coe. by Wright, Brown & Crosley Attys.

UNITED STATES PATENT OFFICE.

JOHN B. COE, OF BOSTON, MASSACHUSETTS.

CULINARY CHOPPER.

SPECIFICATION forming part of Letters Patent No. 489,647, dated January 10, 1893.

Application filed October 29, 1892. Serial No. 450,333. (No model.) Patented in Canada November 16, 1892, No. 41,003.

*To all whom it may concern:*

Be it known that I, JOHN B. COE, of Boston, in the county of Suffolk and State of Massachusetts, have invented certain new and useful Improvements in Culinary Choppers, (for which Letters Patent have been granted to me in the Dominion of Canada, dated November 16, 1892, No. 41,003,) of which the following is a specification.

This invention has relation to that class of kitchen utensils which are designed for the chopping or mincing of meats, vegetables, &c.

It is the purpose of the invention to provide a device of the kind mentioned by which the work it is designed to accomplish may be conveniently, expeditiously, and thoroughly performed, and the substance being operated upon may be kept from being scattered about, the fumes therefrom prevented from escaping, and other advantages gained.

To these ends the invention consists of a closed casing, the top or cover of which is made removable and which supports a tube which serves as a guide and support for a rotary reciprocatory rod and which also incloses a retractile spring, knives or cutters being attached to the lower end of the rod within the casing, all as is hereinafter more fully described and pointed out in the claims.

Reference is to be had to the annexed drawings and to the letters marked thereon, forming a part of this specification, the same letters designating the same parts or features, as the case may be, wherever they occur.

Figure 1:
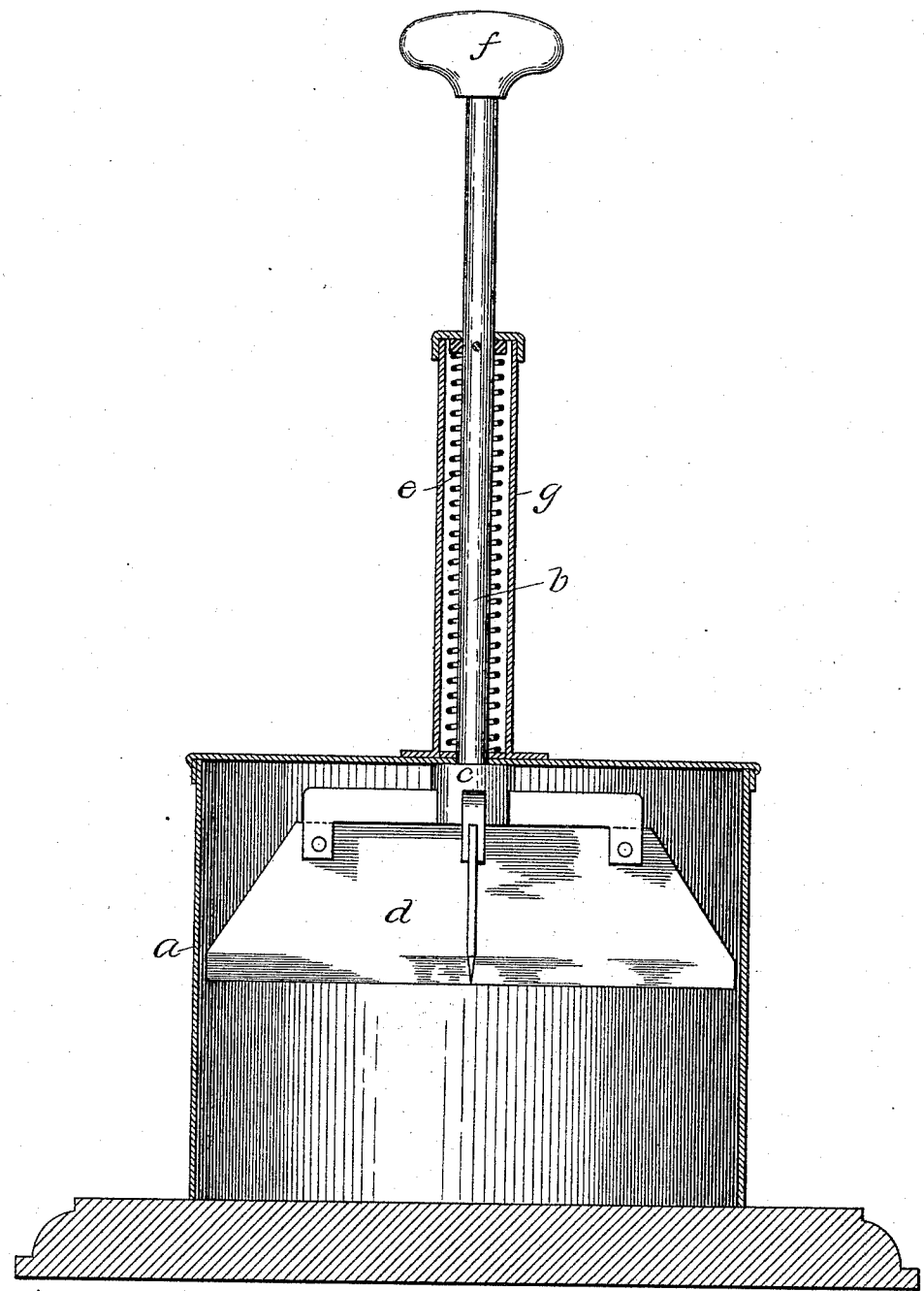
Figure 2:
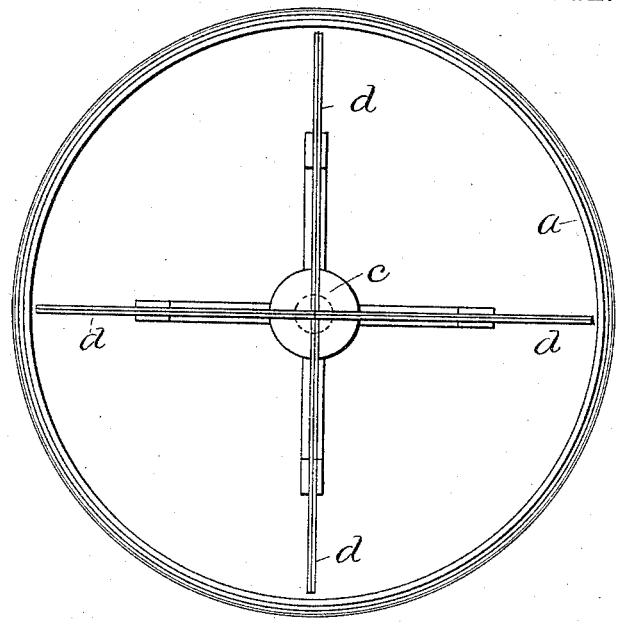
Figures 3, 4:
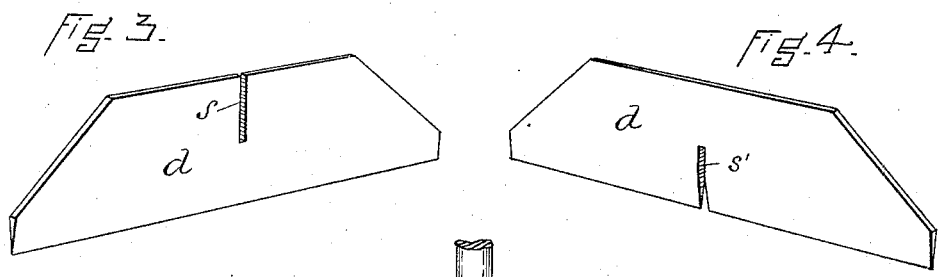
Figure 5:
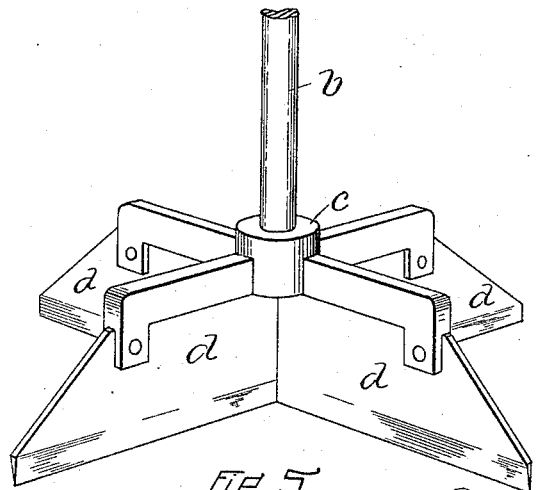

In the drawings—Figure 1 is a vertical longitudinal sectional view of the invention, drawn to an enlarged scale. Fig. 2, is a bottom plan view of the same. Figs. 3 and 4, are perspective views of the cutters, knives, or blades, detached. Fig. 5, is a perspective view of one form of assembling the cutters and connecting them with the hub and reciprocating rod.

In the drawings *a* designates a closed casing, provided with a removable cover, through the center of which there is arranged a reciprocatory rod *b*, provided on its lower end with a hub *c* which supports one or more cutters *d* constructed and arranged to extend from substantially the center to the side of the casing or frame *a*. Instead of connecting the cutters *d* with a hub, they may be connected with a frame or directly with the lower end of the rod *b*. The operating edge of the cutters, if designed to mince material placed upon a flat surface may be made straight, and if upon a concaved or other uneven surface may be made of corresponding form.

*e* designates a helical spring, surrounding the rod *b*, connected thereto at its upper end, and resting at its lower end upon the casing or frame *a*, and *f* is a knob, or it might be a handle on the top or outer end of the rod *b*, affording a means whereby it may be operated by the hand of the user. A tube *g* is supported on the cover of the casing, and is arranged to surround the spring *e* to protect the same and keep it in place, and to serve as a guide and support for the rod *b*. The lower end of the said tube may be soldered or otherwise connected with the cover of the casing. The rod *b* in addition to being adapted to be reciprocated is constructed and arranged so as that it may be rotated.

In use the material to be chopped may be placed within the casing, and the cover carrying the cutters put on, when the operator, by striking light blows on the knob *f* and turning the rod so as to vary the lines upon which the cutters strike, may quickly and thoroughly chop or mince the said material without scattering the same about the point or place where the work is being performed, and without permitting any fumes to escape from the casing during the operation of chopping.

This last mentioned feature of the invention is important, since it is quite disagreeable to housewives to chop some kinds of vegetables, such for instance as onions and peppers, as is frequently done in the manufacture of pickles and other vegetable relishes; and besides, the odors freed from some kinds of vegetables in the operation of chopping the same, reach all parts of a house, are usually quite objectionable to all of the occupants of the house, and are difficult to eradicate or drive out.

The cutters may be constructed as shown, so as to extend across from side to side of the casing, inside of the same, and two such cutters may be arranged at a right angle the one to the other, a slot *s* being formed in the center of the back of one, and a like slot *s'* in the lower part of the other, as shown in Figs 3 and 4, and the two arranged in the form of a cross and attached to the hub and reciprocating rod or bar, as shown in Fig. 5. Any other suitable way of attaching the cutters to the reciprocating rod or bar may, however, be employed.

As before indicated the tube $g$ connected with the top of the cover, not only serves as a guide and support to the rod $b$, but also acts to protect and guard the retractile spring $e$. The chopping means being connected with the cover, when the latter is removed it takes with it the former also, so that unobstructed access may be had to the contents of the casing.

Having thus explained the nature of the invention and described a way of constructing and using the same, though without attempting to set forth all of the forms in which it may be made or all of the modes of its use it is declared that what is claimed is—

A culinary chopper comprising in its construction a closed casing, a removable cover on the said casing, a reciprocatory and rotary rod, a retractile spring for holding the said rod normally raised or withdrawn, a tube connected with the cover for guiding the rod and protecting the spring, and cutters on the lower end of the rod within the closed casing, as set forth.

In testimony whereof I have signed my name to this specification, in the presence of two subscribing witnesses, this 27th day of October, A. D. 1892.

JOHN B. COE.

Witnesses:
ARTHUR W. CROSSLEY,
M. W. JACKSON.